United States Patent
Tolgos

[19]

[11] Patent Number: 5,984,631
[45] Date of Patent: Nov. 16, 1999

[54] TANDEM TURBINE-BLADE CASCADE

[75] Inventor: Sokrates Tolgos, Mahlow, Germany

[73] Assignee: BMW Rolls-Royce GmbH, Oberursel, Germany

[21] Appl. No.: 08/983,361

[22] PCT Filed: Jul. 11, 1996

[86] PCT No.: PCT/EP96/03039

§ 371 Date: Apr. 10, 1998

§ 102(e) Date: Apr. 10, 1998

[87] PCT Pub. No.: WO97/04217

PCT Pub. Date: Feb. 6, 1997

[30] Foreign Application Priority Data

Jul. 14, 1995 [DE] Germany .......................... 195 25 699

[51] Int. Cl.$^6$ ................................ F01D 5/14; F01D 9/04
[52] U.S. Cl. ......................... 415/194; 415/119; 415/195; 416/198 A; 416/200 A; 416/203
[58] Field of Search ..................... 415/119, 193, 415/194, 195, 199.4, 199.5, 209.1; 416/198 A, 200 A, 201 R, 203

[56] References Cited

U.S. PATENT DOCUMENTS

| 2,339,602 | 1/1944 | Hagen | 415/119 |
| 3,006,603 | 10/1961 | Caruso et al. | 415/119 |
| 4,474,534 | 10/1984 | Thode | 415/119 |
| 4,859,145 | 8/1989 | Sidransky . | |
| 5,213,473 | 5/1993 | Fiala . | |

FOREIGN PATENT DOCUMENTS

| 982027 | 6/1951 | France . | |
| 836987 | 4/1952 | Germany . | |
| 1280261 | 10/1968 | Germany . | |
| 2524555 | 12/1975 | Germany . | |
| 3835622 | 11/1990 | Germany . | |
| 3924829 | 2/1991 | Germany . | |
| 4029331 | 1/1992 | Germany . | |
| 428071 | 7/1967 | Sweden . | |
| 766812 | 1/1957 | United Kingdom | 415/119 |

Primary Examiner—Christopher Verdier
Attorney, Agent, or Firm—Pillsbury Madison & Sutro LLP

[57] ABSTRACT

A tandem turbine-blade cascade for a turbine, turbo-engine or power engine includes at least two rows of blades disposed substantially directly in line with one another in the rotor or stator. The second row of blades has a larger number of blades than the first row of blades and the second row of blades are distributed nonuniformly. The spacing ($s_1$) between two blades of the first row of blades is substantially equal to the sum ($s_2$) of two successive blade spacings ($s_{12}$, $s_{22}$) in the second row of blades and the distribution quotient ($s_{12}/s_{22}$) of the blade spacings in the second row is in the range between 0.4 and 1.0.

6 Claims, 1 Drawing Sheet

TANDEM TURBINE-BLADE CASCADE

BACKGROUND OF THE INVENTION

1. Field of the Invention

This application is filed under 35 U.S.C. 371 and claims priority based upon international application PCT/EP96/03039, filed on Jul. 11, 1996, which claims priority based upon German Patent Application P19525699.9, filed on Jul. 14, 1995.

The invention relates to a tandem turbine-blade cascade of a turbo-engine, power engine or other machine, having at least two rows of blades disposed substantially directly in line with one another in the rotor or stator. A turbocompressor with this kind of tandem turbine-blade cascade is shown for instance in German Patent DE 36 24 951 C1.

2. Description of the Related Art

Such tandem turbine-blade cascades can be provided in particular in turbine aircraft engines, in the compressor or the turbine, in order to achieve the pressure ratios needed in as few stages as possible. This leads to a desired weight reduction, but on the other hand, puts a greater aerodynamic load on the individual stage. Especially for the case of a compressor stage, this means that among other things that a greater deflection and/or retardation in the flow must be effected in the rotor with regard to the relative system, or in the ensuing stator with regard to the absolute system. However, this is possible only to a limited extent, since an excessive aerodynamic load on the cascade leads to a flow separation and thus, to increased pressure losses. These losses can be reduced if the cascade load is divided between two rows of blades disposed substantially directly one behind the other or directly in a line in the rotor or stator. The two rows of blades disposed substantially in a line may be positioned differently relative to one another in both the axial and circumferential directions, which affects the pressure index and the efficiency. In this regard, reference may be made to the studies by Linnemann reported in the German Journal "Konstruktion" [Construction] 1964, No. 4, p. 128. With regard to the phrase "substantially directly", reference is briefly made to FIG. 1, later to be described in further detail, which is taken from precisely this reference in the literature (Linnemann). Here, one can see the two rows 1, 2 of blades, for instance in a rotor, which are spaced apart from one another by the dimension a*, and between which no further row of blades, for instance of a stator, protrudes. Each value a*, which is less than the chord length c and can even assume negative values, is intended to represent substantially in-line rows 1, 2 of blades as long as no further row of blades protrudes between these rows of blades.

If the second or subsequent row of blades is now heavily loaded aerodynamically in such a way that a larger number of blades would have to be provided in this row of blades than in the preceding row of blades, then for some of the blades in the second row, the result can be unfavorable positions in the circumferential direction, in terms of the pressure index and efficiency. The object of the present invention is to disclose remedies for these problems.

SUMMARY OF THE INVENTION

To attain this object, it is provided that the cascade of the second or subsequent row of blades has a larger number of blades than the row of blades preceding it and is distributed nonuniformly. In particular, this nonuniform distribution may be made periodic in form. In a preferred embodiment, the second row of blades in the flow direction has twice as many blades as the first row of blades; the spacing between two blades in the first row of blades is equal to the sum of two successive blade spacings in the second row of blades, and that the distribution quotient of the blade spacings in the second row of blades is in the range between 0.4 and 1.0. In this preferred embodiment as well, the nonuniform distribution can repeat periodically.

DESCRIPTION OF THE DRAWINGS

The invention will be described in further detail in terms of the basic sketch shown in FIG. 2 of a preferred exemplary embodiment, while

DETAILED DESCRIPTION OF THE INVENTION

In each case, the drawings show partial developed views of a tandem turbine-blade cascade, comprising two rows 1, 2 of blades, of a turbo-engine, power engine or other machine. The two rows 1, 2 of blades are disposed substantially in line with one another; that is, between the two rows 1, 2 of blades, which are provided for instance on the rotor, no further row of blades of the stator protrudes; the axial component of the flow direction is represented by the horizontal arrow 3.

Figure 2:
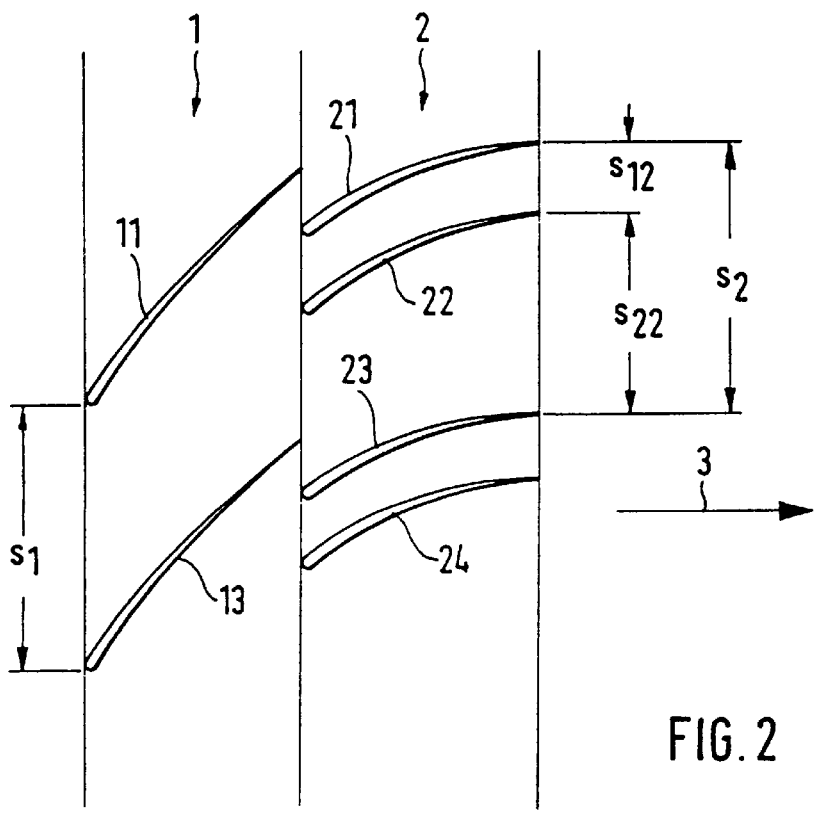

As the preferred exemplary embodiment of FIG. 2 shows, twice as many blades 21, 22, 23, 24 are provided in the second row 2 of blades than in the first row 1 of blades, of which blades 11, 13 are shown. The arrangement is such that the spacing $s_1$ between the two blades 11, 13 is equal to the sum of two successive blade spacings $s_{12}$ and $s_{22}$ between the blades 21 and 22 on the one hand and 22 and 23 on the other of the second blade row 2. Thus, the spacing $s_1$ is equal to the spacing $s_2$, which is the sum of $s_{12}$ and $s_{22}$. For the blade row 2, a higher number of blades was chosen than for the blade row 1, in order to reduce the error of dynamic load in the second blade row 2. Thus, the most favorable possible distribution ratios s/c are intended to be achieved in the second blade row 2 as well.

Figure 1:
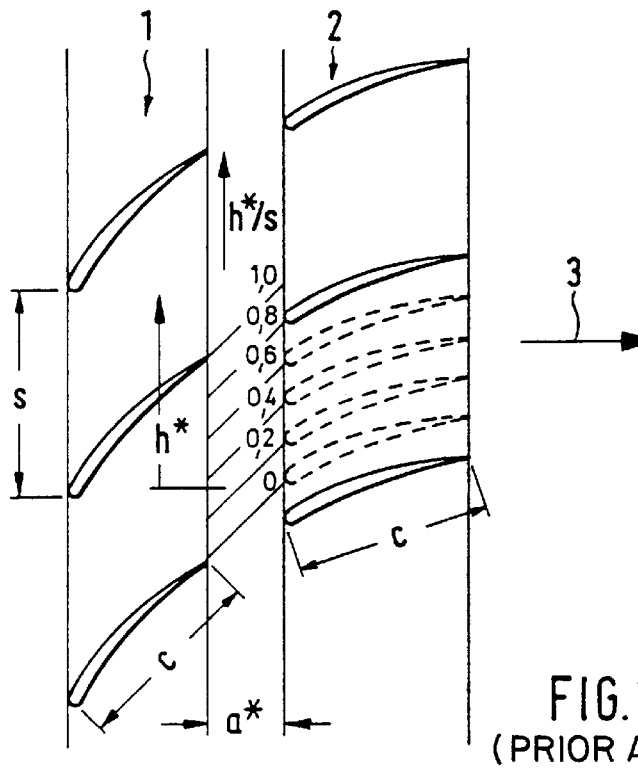
FIG. 1 shows an excerpt from the aforementioned literature (Linnemann) and serves to explain the fundamental conditions.

Nevertheless, it is known that the position of the blades of the second blade row 2 with regard to the first blade row 1, both circumferentially and axially, is of substantial influence on the pressure index and efficiency. This will briefly be explained, referring to FIG. 1. In this drawing, s generally designates the spacing between two blades of one row of blades, while as usual, the chord length of the blade profile is marked c. The axial spacing between the first blade row 1 and the second blade row 2 is designated a*, while h* represents the ordinate pointing in the circumferential direction and indicates how far a blade of the second blade row 2 is offset from the associated blade of the first blade row 1. The ratio h*/s for the various blade positions, drawn in dashed lines, in the second row 2 of blades is indicated numerically in FIG. 1.

If now, as shown in FIG. 2, for instance twice as many blades are provided in the second blade row 2 than in the first blade row 1, and if these blades 21, 22, 23, 24 of the second blade row 2 form a periodically uniformly distributed cascade, then every second blade 22, 24 in this blade row 2 would be in an unfavorable position in the circumferential direction; that is, there would be an unfavorable h*/s position (of the kind shown in FIG. 1) for every second blade 22, 24. According to the invention, it is therefore provided that the second or generally the subsequent blade row 2 is given what here is a periodically nonuniform distribution; that is, the corresponding blade cascade is embodied as distributed periodically nonuniformly. In other words, the spacing $s_{12}$ is not equal to the spacing $s_{22}$. Thus the blades 22, 24 in the exemplary embodiment shown in FIG. 2 can be positioned in the lower-loss h*/s regions. However, this shift compared with a periodically uniform distribution should not be overly great, because otherwise the respective blades 21 and 22; 23 and 24 would be loaded too differently from one another and in different ways, which in turn would have unfavorable effects on the flow conditions. Especially advantageous conditions are obtained if twice as many blades are provided in the second blade row 2 compared with the first row 1 of blades, whenever the distribution quotient $s_{12}/s_{22}$ of the blade spacings in the second blade row 2 is in the range between 0.4 and 1.0.

In general, in the use of a tandem turbine-blade cascade, the use of a nonuniformly distributed second or subsequent blade row 2 leads to lower losses and hence to better overall efficiency of the turbo-engine, power engine or other machine. It is understood that some other multiple, and in particular, a non-integral multiple, of blades, may be provided in the second or subsequent blade row 2 compared with the first blade row 1, other than what is shown in FIG. 2. This plurality of blades, with a nonuniform distribution, can always be positioned optimally with regard to the pressure index and efficiency, and particularly in the case of integral multiples, the nonuniform distributions periodically repeat. It will be noted once again that the essential concept of the present invention resides in the nonuniform distribution. The special case of a periodically repeating nonuniform distribution makes sense only in the case where the number of blades involved are integral multiples.

What is claimed is:

1. A tandem turbine-blade cascade of at least one of a turbine, turbo-engine, and power engine, having at least a preceding row of blades and a subsequent row of blades disposed substantially directly in line with one another in at least one of a rotor and a stator, wherein the cascade of the subsequent row of blades has a larger number of blades than that of the preceding row of blades and the blades of the subsequent row are distributed nonuniformly and, a spacing ($s_1$) between two blades in the preceding row of blades is substantially equal to the sum ($s_2$) of two successive blade spacings ($s_{12}$, $s_{22}$) in the subsequent row of blades, and the distribution quotient ($s_{12}/s_{22}$) of the blade spacings in the subsequent row of blades is in the range between 0.4 and 1.0.

2. The tandem turbine-blade cascade of claim 1, wherein the subsequent row of blades, in terms of a flow direction, has an integral multiple number of blades compared with the preceding row of blades and is distributed periodically non-uniformly.

3. The tandem turbine-blade cascade of claim 2, wherein the subsequent row of blades has twice as many blades as the preceding row of blades.

4. The tandem turbine-blade cascade of claim 1, installed in a turbine.

5. The tandem turbine-blade cascade of claim 1, installed in a turbo-engine.

6. The tandem turbine-blade cascade of claim 1, installed in a power engine.

* * * * *